(12) United States Patent
Zhang

(10) Patent No.: US 11,244,144 B2
(45) Date of Patent: Feb. 8, 2022

(54) AGE RECOGNITION METHOD, COMPUTER STORAGE MEDIUM AND ELECTRONIC DEVICE

(71) Applicant: BOE TECHNOLOGY GROUP CO., LTD., Beijing (CN)

(72) Inventor: Huanhuan Zhang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 30 days.

(21) Appl. No.: 16/815,613

(22) Filed: Mar. 11, 2020

(65) Prior Publication Data

US 2021/0089753 A1  Mar. 25, 2021

(30) Foreign Application Priority Data

Sep. 24, 2019 (CN) .......................... 201910905256.X

(51) Int. Cl.
*G06K 9/00* (2006.01)
*G06T 5/00* (2006.01)
*G06T 7/60* (2017.01)

(52) U.S. Cl.
CPC ..... *G06K 9/00248* (2013.01); *G06K 9/00281* (2013.01); *G06K 9/00288* (2013.01); *G06T 5/002* (2013.01); *G06T 7/60* (2013.01); *G06K 2009/00322* (2013.01); *G06T 2207/30201* (2013.01)

(58) Field of Classification Search
CPC ........... G06K 9/00248; G06K 9/00281; G06K 9/00288; G06K 2009/00322; G06K 9/00268; G06K 9/00228; G06T 5/002; G06T 7/60; G06T 2207/30201

See application file for complete search history.

(56) References Cited

U.S. PATENT DOCUMENTS

| 5,781,650 A * | 7/1998 | Lobo ................... | G06K 9/00221 382/118 |
| 7,522,773 B2 * | 4/2009 | Gallagher .......... | G06K 9/00288 382/118 |
| 8,027,521 B1 * | 9/2011 | Moon ................ | G06K 9/00288 382/118 |
| 2018/0293429 A1 * | 10/2018 | Wechsler ........... | G06K 9/00926 |

FOREIGN PATENT DOCUMENTS

| CN | 104143097 A | 11/2014 |
| CN | 107545249 A | 1/2018 |
| CN | 109271958 A | 1/2019 |

* cited by examiner

*Primary Examiner* — Phuoc Tran
(74) *Attorney, Agent, or Firm* — The Webb Law Firm

(57) ABSTRACT

The present invention provides an age recognition method, a computer program and an electronic device. The method comprises: acquiring a face image to be recognized; extracting face characteristic points in the face image to be recognized, and characteristic point coordinates of the face characteristic points in the face image to be recognized; extracting face global features from the face image to be recognized according to the characteristic point coordinates; extracting face local features from the face image to be recognized according to the face characteristic points; and determining an age recognition result corresponding to the face image to be recognized according to the face global features, the face local features and an age recognition model obtained by pre-training.

17 Claims, 6 Drawing Sheets

AGE RECOGNITION METHOD, COMPUTER STORAGE MEDIUM AND ELECTRONIC DEVICE

CROSS-REFERENCE TO RELATED APPLICATION

This application claims priority to Chinese Patent Application No. 201910905256.X filed Sep. 24, 2019, the disclosure of which is hereby incorporated by reference in its entirety.

BACKGROUND OF THE INVENTION

The present invention relates to the technical field of face image processing, and in particular, to an age recognition method, a computer storage medium, and an electronic device.

FIELD OF THE INVENTION

With the development of face recognition technologies, people have higher and higher requirements on recognitions of face attributes, especially for age recognition of face.

At present, a general age recognition algorithm is a method of CNN (Convolutional Neural Networks) deep learning technology, and although the CNN technology algorithm has a higher accuracy, it is high in complexity, time-consuming and high in requirement on hardware.

SUMMARY OF THE INVENTION

According to an aspect of the present disclosure, there is provided an age recognition method, comprising:

acquiring a face image to be recognized;

extracting face characteristic points in the face image to be recognized and characteristic point coordinates of the face characteristic points in the face image to be recognized;

extracting face global features from the face image to be recognized according to the characteristic point coordinates;

extracting face local features from the face image to be recognized according to the face characteristic points; and determining an age recognition result corresponding to the face image to be recognized according to the face global features, the face local features and an age recognition model obtained by pre-training.

Alternatively, after extracting face characteristic points in the face image to be recognized and characteristic point coordinates of the face characteristic points in the face image to be recognized, the method further comprises:

denoising the face image to be recognized to obtain a denoised face image;

performing a geometric correction process on a face region in the denoised face image according to the characteristic point coordinates, to generate a corrected face image; and acquiring from the corrected face image corrected characteristic points corresponding to the face characteristic points, and corrected characteristic point coordinates corresponding to the corrected characteristic points.

Alternatively, that extracting face global features from the face image to be recognized according to the characteristic point coordinates comprises:

calculating a width and a height of a corrected face region according to the corrected characteristic point coordinates;

performing a normalization process on the corrected characteristic point coordinates according to the width and the height, to obtain normalized coordinates; and processing the normalized coordinates to generate the face global features.

Alternatively, that performing a normalization process on the corrected characteristic point coordinates according to the width and the height, to obtain normalized coordinates comprises:

performing a normalization process on horizontal coordinates corresponding to the corrected characteristic point coordinates according to the width, to obtain normalized horizontal coordinates; and performing a normalization process on vertical coordinates corresponding to the corrected characteristic point coordinates according to the height, to obtain normalized vertical coordinates.

Alternatively, that processing the normalized coordinates to generate the face global features comprises:

generating a one-dimensional global feature vector according to the normalized horizontal coordinates and the normalized vertical coordinates, and taking the one-dimensional global feature vector as the face global features.

Alternatively, after acquiring from the corrected face image corrected characteristic points corresponding to the face characteristic points and corrected characteristic point coordinates corresponding to the corrected characteristic points, the method further comprises:

performing a size transformation process on the corrected face region corresponding to the corrected face image according to a preset ratio, to obtain a transformed face image; and performing a coordinate transformation process on the corrected characteristic point coordinates according to the preset ratio, to obtain transformed characteristic point coordinates.

Alternatively, that extracting face local features from the face image to be recognized according to the face characteristic points comprises:

determining a region of interest in a transformed face region corresponding to the transformed face image according to the transformed face characteristic points in the transformed face image;

extracting initial face local features in the region of interest by adopting a preset feature extraction algorithm; and calculating normalized histogram features corresponding to the initial face local features, and taking the normalized histogram features as the face local features.

According to another aspect of the present disclosure, there is provided an age recognition device, comprising:

an image to be recognized acquiring module configured to acquire a face image to be recognized;

a characteristic point coordinate extracting module configured to extract face characteristic points in the face image to be recognized and characteristic point coordinates of the face characteristic points in the face image to be recognized;

a global feature extracting module configured to extract face global features from the face image to be recognized according to the characteristic point coordinates;

a local feature extracting module configured to extract face local features from the face image to be recognized according to the face characteristic points; and a recognition result determining module configured to determine an age recognition result corresponding to the face image to be recognized according to the face global features, the face local features and an age recognition model obtained by pre-training.

Alternatively, the face recognition device further comprises:

a denoised image acquiring module configured to denoise the face image to be recognized to obtain a denoised face image;

a corrected image generating module configured to perform a geometric correction process on a face region in the denoised face image according to the characteristic point coordinates, to generate a corrected face image; and a corrected characteristic point acquiring module configured to acquire from the corrected face image corrected characteristic points corresponding to the face characteristic points, and corrected characteristic point coordinates corresponding to the corrected characteristic points.

Alternatively, the global feature extracting module comprises:

a height and width calculating sub-module configured to calculate a width and a height of a corrected face region according to the corrected characteristic point coordinates;

a normalized coordinate acquiring sub-module configured to perform a normalization process on the corrected characteristic point coordinates according to the width and the height, to obtain normalized coordinates; and a global feature generating sub-module configured to process the normalized coordinates to generate the face global features.

Alternatively, the global feature generating sub-module comprises:

a normalized horizontal coordinate acquiring sub-module configured to perform a normalization process on horizontal coordinates corresponding to the corrected characteristic point coordinates according to the width, to obtain normalized horizontal coordinates; and a normalized vertical coordinate acquiring sub-module configured to perform a normalization process on vertical coordinates corresponding to the corrected characteristic point coordinates according to the height, to obtain normalized vertical coordinates.

Alternatively, the global feature generating sub-module comprises:

a face global feature acquiring sub-module configured to generate a one-dimensional global feature vector according to the normalized horizontal coordinates and the normalized vertical coordinates, and taking the one-dimensional global feature vector as the face global features.

Alternatively, the age recognition device further comprises:

a transformed image acquiring module configured to perform a size transformation process on the corrected face region corresponding to the corrected face image according to a preset ratio, to obtain a transformed face image; and a transformed feature acquiring module configured to perform a coordinate transformation process on the corrected characteristic point coordinates according to the preset ratio, to obtain transformed characteristic point coordinates.

Alternatively, the local feature extracting module comprises:

a region of interest determining sub-module configured to determine a region of interest in a transformed face region corresponding to the transformed face image according to the transformed face characteristic points in the transformed face image;

an initial local feature extracting sub-module configured to extract initial face local features in the region of interest by adopting a preset feature extraction algorithm; and a face local feature acquiring sub-module configured to calculate normalized histogram features corresponding to the initial face local features, and take the normalized histogram features as the face local features.

According to another aspect of the present disclosure, there is provided an electronic device, comprising: a processor, a memory and a computer program stored on the memory and executable on the processor, the processor, when executing the program, implementing any of the aforementioned age recognition methods.

According to another aspect of the present disclosure, there is provided a non-transitory computer storage medium having stored thereon computer-readable program instructions, when executed by a processor, perform the age recognition method as described above.

DESCRIPTION OF THE INVENTION

In order to make the objectives, features, and advantages of the present disclosure clearer and more comprehensible, the present disclosure is described in the following further in detail with reference to the accompanying drawings and the embodiments.

Compared with the prior art, the present disclosure has the following advantages: the embodiments of the present disclosure provide an age recognition method, a computer storage medium and an electronic device, comprise: acquiring a face image to be recognized; extracting face characteristic points in the face image to be recognized, and characteristic point coordinates of the face characteristic points in the face image to be recognized; extracting face global features from the face image to be recognized according to the characteristic point coordinates; extracting face local features from the face image to be recognized according to the face characteristic points; and determining an age recognition result corresponding to the face image to be recognized according to the face global features, the face local features and an age recognition model obtained by pre-training. The age recognition model provided by the embodiments of the present disclosure can effectively reduce the influences of different image resolutions, sexes, different face postures and expressions on the face age recognition by fusing the global features and the local features, is high in algorithm precision and speed, and is low in requirement on hardware.

Figure 1:
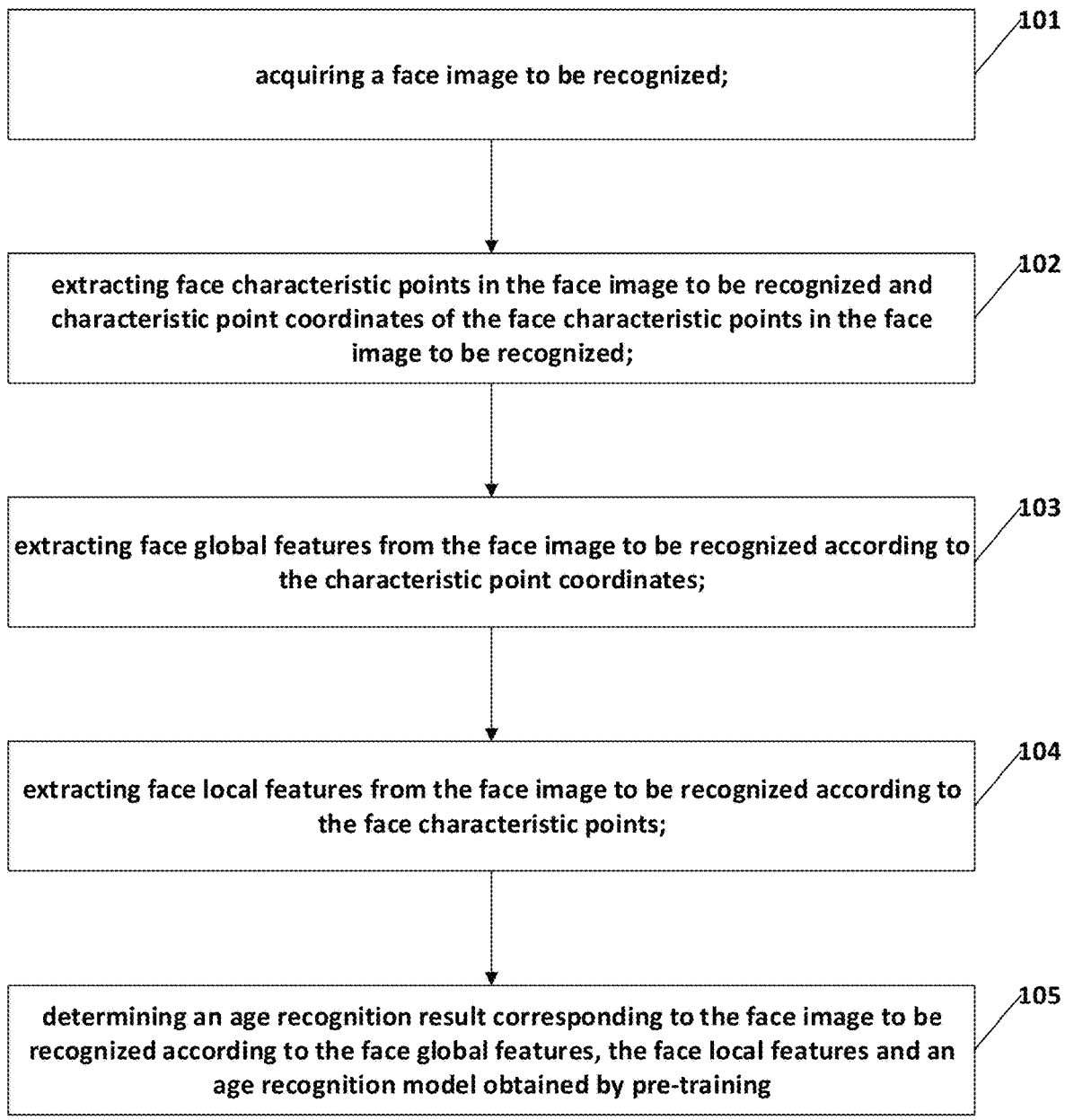
FIG. 1 is a flowchart illustrating steps of an age recognition method provided by an embodiment of the present disclosure.

FIG. 1 is a flowchart illustrating steps of an age recognition method provided by an embodiment of the present disclosure, where the age recognition method may specifically comprise the following steps:

step 101: acquiring a face image to be recognized.

The embodiment of the present disclosure can use the age recognition model obtained by training to recognize an age of the user according to the face image to be recognized.

The face image to be recognized means an image for recognizing the age of the user.

In some examples, the face image of the user may be captured by a video camera or a camera preset in a mobile terminal to acquire the face image to be recognized.

In some examples, a face image can be selected from face images uploaded by the user on the internet to serve as the face image to be recognized.

Naturally, in a specific implementation, a person skilled in the art may acquire the face image to be recognized in other manners, which may be specifically determined according to business requirements, and are not limited in this embodiment of the present disclosure.

After the face image to be recognized is acquired, step 102 is executed.

Step 102: extracting face characteristic points in the face image to be recognized, and characteristic point coordinates of the face characteristic points in the face image to be recognized.

The face characteristic points refer to key points of the face, such as points on the corners of eyes, the corners of mouth, nose and other positions.

The face characteristic points generally include 68 characteristic points, and the face characteristic points extracted in the embodiment of the present disclosure may be all 68 characteristic points, and may also be other numbers of characteristic points, which may be specifically determined according to business requirements.

After the face image to be recognized is obtained, a dlib library can be used for face detection, and face characteristic points in the face image to be recognized are extracted according to a detection result.

Naturally, the face characteristic points in the face image to be recognized can be extracted in other manners, for example, firstly, the face image to be recognized is subjected to face detection positioning and cutting and three-channel multi-feature-diagram fusion to obtain a three-channel GEH pattern diagram Picture, then, the three-channel GEH pattern diagram obtained by fusing the three feature diagrams serves as an input to a convolutional neural network to extract network face features, finally, a gradient direction propagation algorithm is adopted to carry out network training on a double-task loss function, a face characteristic point detection weight is finally learned. In the test process, the face characteristic point detection is realized by the same face feature extraction network.

In a specific implementation, the face characteristic points in the face image to be recognized can be extracted in other manners, which are not limited in the embodiments of the present disclosure.

The characteristic point coordinates refer to two-dimensional coordinates of the face characteristic points in the face image to be recognized, for example, a two-dimensional image coordinate system may be established by using an upper left corner of the face image to be recognized as an origin of the coordinates, and the characteristic point coordinates corresponding to the face characteristic points may be extracted according to positions of the face characteristic points.

After extracting the face characteristic points in the face image to be recognized and the characteristic point coordinates of the face characteristic points in the face image to be recognized, step 103 is executed.

Step 103: extracting face global features from the face image to be recognized according to the characteristic point coordinates.

The face global features refer to face features constructed by combining all key points of a face.

After obtaining the characteristic point coordinates corresponding to the face characteristic points in the face image to be recognized, the face global features can be extracted from the face image to be recognized according to the characteristic point coordinates. Specifically, corresponding normalized coordinates can be obtained according to all characteristic point coordinates of the face in the face image, and horizontal coordinates and vertical coordinates in all the normalized coordinates are connected to generate a one-dimensional feature vector which can be regarded as a face global feature.

Specific implementations for extracting the face global features will be described in detail in the following embodiments, which are not described herein again.

Step 104: extracting face local features from the face image to be recognized according to the face characteristic points.

The face local features refer to local features obtained by connecting features extracted according to the region of interest of the face.

After extracting the face characteristic points in the face image to be recognized, the face local features can be extracted from the face image to be recognized according to the face characteristic points, specifically, a region of interest can be determined from a face region of the face image to be recognized according to the face characteristic points, then initial local features are extracted from the region of interest, then normalized histogram features corresponding to the initial local features are calculated, and the normalized histogram features can be used as the face local features.

A detailed process of extracting the face local features from the face image to be recognized will be described in detail in the following embodiments, which are not described herein again in this embodiment of the present disclosure.

Step 105: determining an age recognition result corresponding to the face image to be recognized according to the face global features, the face local features and an age recognition model obtained by pre-training.

After obtaining the face global features and the face local features in the face image to be recognized, the face global features and the face local features can be used as age recognition features corresponding to the face image to be recognized.

The age recognition model is a model that can recognize an age of a user according to a face image of the user, and the age recognition model in the embodiment of the present disclosure may be an SVM (Support Vector Machine) classifier.

The age recognition model can be obtained by training a plurality of sample face images of a preset age group, and a specific process thereof can refer to the following description.

The preset age group may be an age group preset by service personnel, for example, the service personnel may preset 5 to 10 years old as an age group, 10 to 15 years old as an age group, 15 to 20 years old as an age group, and the like.

It is to be understood that the above examples are only examples listed for the purpose of better understanding of the technical solutions of the embodiments of the present disclosure, and are not intended as only limitations to the embodiments of the present disclosure.

The sample face images refer to images used for training the age recognition model, and in a specific implementation, 800 or 1000 etc. sample face images may be selected to train the model, and specifically, the number may be determined according to an actual situation, which is not limited in the embodiment of the present disclosure.

Naturally, multiple sample face images can be respectively selected for different preset age groups to train the model, and the number of the sample face images selected for each preset age group may be the same or different, and is not limited in the embodiment of the present disclosure.

In some examples, the sample face images may be a plurality of sample face images of a preset age group collected by business personnel.

In some examples, the sample face images may be a plurality of sample face images of a preset age group downloaded by business personnel through Internet search.

Of course, without being limited to this, in specific implementations, the sample face images of the preset age group can be obtained in other manners, the sample face image of the preset age group are acquired from a preset face image database, and the like, and specifically, these may be determined according to business requirements and are not limited in the embodiment of the present disclosure.

After acquiring the sample face images of a preset age group, face global features and face local features in the sample face image can be respectively extracted, and the face global features and the face local features are input into an SVM classifier for training as age features corresponding to the preset age group, so that an age recognition model can be obtained.

It is to be understood that the above model training process is merely a model training scheme provided for better understanding the technical solution of the embodiment of the present disclosure, and in a specific implementation, a person skilled in the art may also adopt other model training modes, which are not limited in this embodiment of the present disclosure.

After obtaining the age recognition model through training, the age recognition features corresponding to the face image to be recognized can be input into the age recognition model obtained through pre-training, and an age recognition result corresponding to the face image to be recognized, namely an age group of the user corresponding to the age to be recognized, can be determined from the age recognition model according to the age recognition features.

The age recognition model provided by the embodiment of the present disclosure can effectively reduce the influences of different image resolutions, sexes, different face postures and expressions on the face age recognition by fusing the global features and the local features, and is high in algorithm precision and speed.

The age recognition method provided by the embodiments of the present disclosure comprises: acquiring a face image to be recognized; extracting face characteristic points in the face image to be recognized and characteristic point coordinates of the face characteristic points in the face image to be recognized; extracting face global features from the face image to be recognized according to the characteristic point coordinates; extracting face local features from the face image to be recognized according to the face characteristic points; and determining an age recognition result corresponding to the face image to be recognized according to the face global features, the face local features and an age recognition model obtained by pre-training. The age recognition model provided by the embodiments of the present disclosure can effectively reduce the influences of different image resolutions, sexes, different face postures and expressions on the face age recognition by fusing the global features and the local features, is high in algorithm precision and speed, and is low in requirement on hardware.

Figure 2:
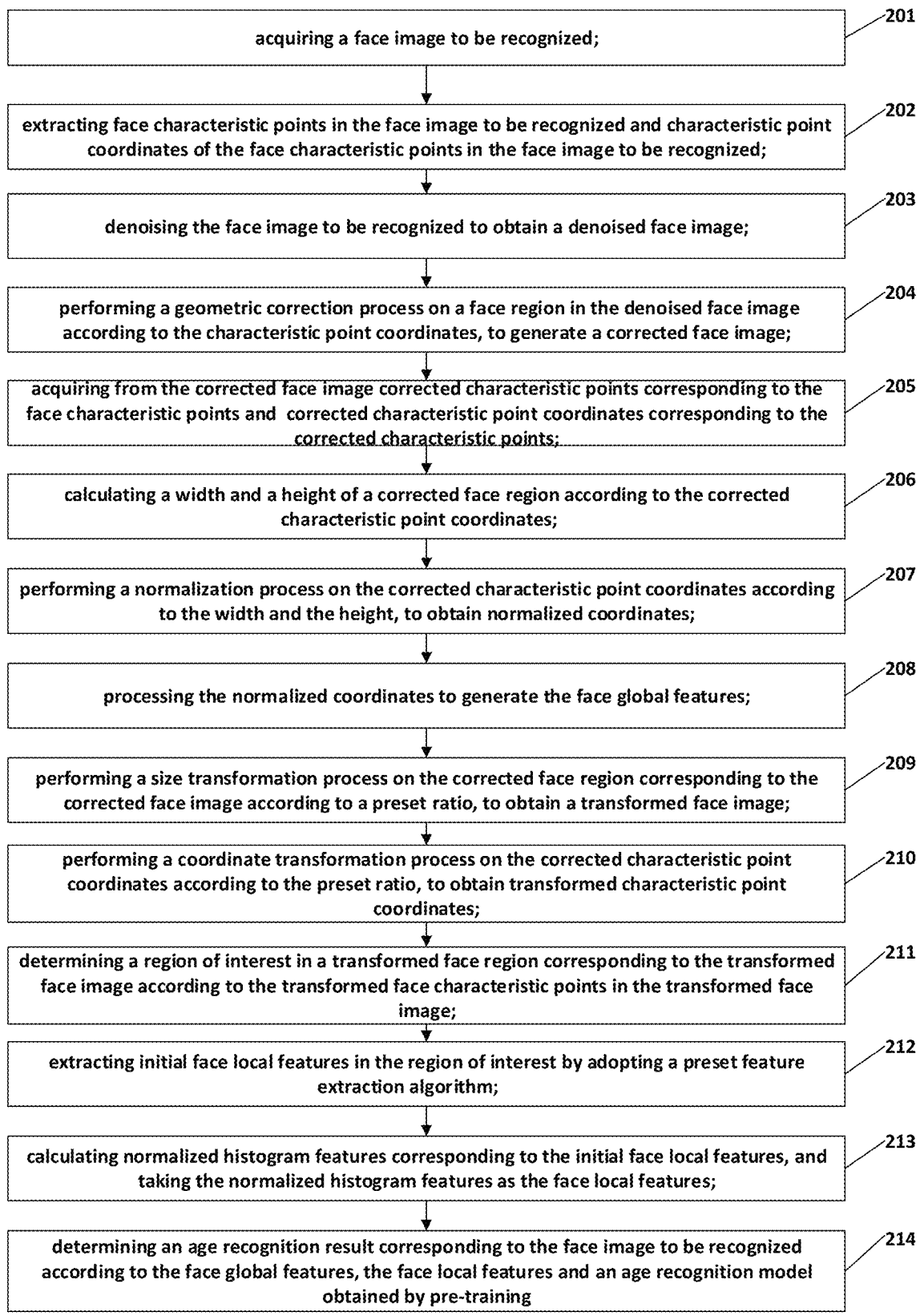
FIG. 2 is a flowchart illustrating steps of an age recognition method provided by an embodiment of the present disclosure.

FIG. 2 is a flowchart illustrating steps of an age recognition method provided by an embodiment of the present disclosure, where the age recognition method may specifically comprise the following steps:

step 201: acquiring a face image to be recognized.

The embodiment of the present disclosure can use the age recognition model obtained by training to recognize an age of the user according to the face image to be recognized.

The face image to be recognized means an image for recognizing the age of the user.

In some examples, the face image of the user may be captured by a video camera or a camera preset in a mobile terminal to acquire the face image to be recognized.

In some examples, a face image can be selected from face images uploaded by the user on the Internet to serve as the face image to be recognized.

Naturally, in a specific implementation, a person skilled in the art may acquire the face image to be recognized in other manners, which may be specifically determined according to business requirements, and are not limited in this embodiment of the present disclosure.

After the face image to be recognized is acquired, step 202 is executed.

Step 202: extracting face characteristic points in the face image to be recognized and characteristic point coordinates of the face characteristic points in the face image to be recognized.

The face characteristic points refer to key points of the face, such as points on the corners of eyes, the corners of mouth, nose and other positions.

The face characteristic points generally include 68 characteristic points, and the face characteristic points extracted in the embodiment of the present disclosure may be all 68 characteristic points, and may also be other numbers of characteristic points, which may be specifically determined according to business requirements.

After the face image to be recognized is obtained, a dlib library can be used for face detection, and face characteristic points in the face image to be recognized are extracted according to a detection result.

Naturally, the face characteristic points in the face image to be recognized can be extracted in other manners, for example, firstly, the face image to be recognized is subjected to face detection positioning and cutting and three-channel multi-feature-diagram fusion to obtain a three-channel GEH pattern diagram Picture, then, the three-channel GEH pattern diagram obtained by fusing the three feature diagrams serves as an input to a convolutional neural network to extract network face features, finally, a gradient direction propagation algorithm is adopted to carry out network training on a double-task loss function, a face characteristic point detection weight is finally learned. In the test process, the face characteristic point detection is realized by the same face feature extraction network.

In a specific implementation, the face characteristic points in the face image to be recognized can be extracted in other manners, which are not limited in this embodiment of the present disclosure.

The characteristic point coordinates refer to two-dimensional coordinates of the face characteristic points in the face image to be recognized, for example, a two-dimensional image coordinate system may be established by using an upper left corner of the face image to be recognized as an origin of the coordinates, and the characteristic point coordinates corresponding to the face characteristic points may be extracted according to positions of the face characteristic points.

After extracting the face characteristic points in the face image to be recognized and the characteristic point coordinates of the face characteristic points in the face image to be recognized, step 203 is executed.

step 203: denoising the face image to be recognized to obtain a denoised face image.

The denoising face image refers to a face image obtained after denoising a sample face image.

The denoising process, i.e., image denoising, refers to a process of reducing noise in a digital image, which is called image denoising. The digital image in reality often suffers from noise interference of imaging device and external environment in the process of digitalization and transmission, and is called noisy image or noise image.

When performing image denoising, a filter is generally used, such as a mean filter, an adaptive wiener filter, a median filter, a morphological noise filter, and the like, which can be determined according to business requirements, and are not limited in this embodiment of the present disclosure.

The denoised face image corresponding to the face image to be recognized can be obtained by denoising the face image to be recognized.

After denoising the face image to be recognized to obtain a denoised face image, step 204 is executed.

Step 204: performing a geometric correction process on a face region in the denoised face image according to the characteristic point coordinates, to generate a corrected face image.

The geometric correction refers to a process of eliminating or correcting geometric errors in a sample face image.

The corrected face image refers to the face image obtained after performing a geometric correction process on a face region in the denoised face image, and the situation that the face in the original face image is skewed and the like can be avoided in the original face image by means of a geometric correction process.

After obtaining the denoised face image, the face region in the denoised face image can be subjected to the geometric correction process according to the face characteristic point coordinates, and specifically, an affine transformation matrix can be determined according to the characteristic point coordinates, and the face region in the denoised face image can be subjected to the geometric correction process according to the affine transformation matrix, thereby generating a corrected face image.

Affine transformation is geometrically defined as an affine transformation or affine mapping between two vector spaces (from Latin, affine, "associated with . . . ") and consists of a non-singular linear transformation (transformation using a linear function) followed by a translation transformation. In the case of finite dimensions, each affine transformation can be given by a matrix A and a vector b, and can be written as A and an additional column b. An affine transformation corresponds to a multiplication of a matrix and a vector, while a complex affine transformation corresponds to a normal matrix multiplication, as long as an extra row is added to the bottom of the matrix, which row is all 0 except for the rightmost edge being 1, while the bottom of the column vector is added with 1.

The technology for determining the affine transformation matrix according to the characteristic point coordinates is a mature technical solution in the art, and this process is not described in detail in the embodiment of the present disclosure.

After obtaining the affine transformation matrix, the geometric correction can be performed on the face region in the denoised face image according to the affine transformation matrix, so that a corrected face image is generated, and the position of the face in the image in the phase plane can be corrected through the geometric correction.

After performing the geometric correction process on the face region in the denoised face image according to the characteristic point coordinates to generate a corrected face image, step 205 is executed.

Step 205: acquiring from the corrected face image corrected characteristic points corresponding to the face characteristic points, and corrected characteristic point coordinates corresponding to the corrected characteristic points.

After pre-processing operations (i.e., the processing operations such as the denoising and geometric correction) on the face image to be recognized, a position of the generated corrected face image changes with respect to the position of the face region in the face image to be recognized, and the face characteristic points (i.e., corrected characteristic points) in the corrected face image, corresponding to the face image to be recognized, can be determined according to the changed position.

The corrected characteristic point coordinates are then determined according to the changed position of the corrected characteristic points.

After acquiring from the corrected face image the corrected characteristic points corresponding to the face characteristic points and the corrected characteristic point coordinates corresponding to the corrected characteristic points, step 206 is executed.

Step 206: calculating a width and a height of the corrected face region according to the corrected characteristic point coordinates.

The corrected face region refers to a region where the face is located in a generated corrected face image after the face image to be recognized is preprocessed.

The width refers to the width of the corrected face region, and the height is the height of the corrected face region.

Figure 1A:
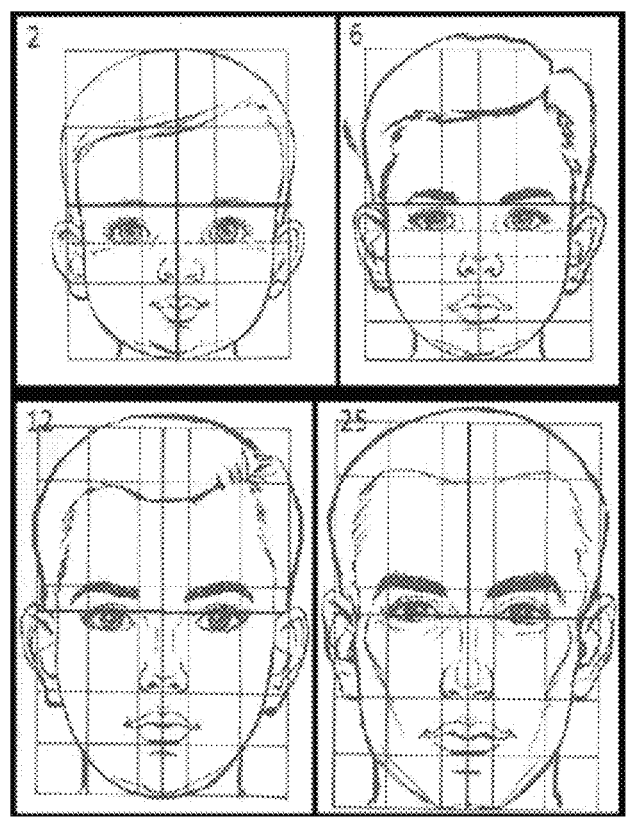
FIG. 1a is a schematic diagram illustrating a sample face image provided by an embodiment of the present disclosure.

The corrected face region may be a face region collectively composed of the maximum horizontal coordinate and the minimum horizontal coordinate and the maximum vertical coordinate and the minimum vertical coordinate in the corrected characteristic point coordinates, i.e., a square region. For example, FIG. 1a is a schematic diagram illustrating a sample face image provided by the embodiment of the present disclosure, and as shown in FIG. 1a, a square frame formed by the outermost horizontal lines is a corrected face region.

Of course, when calculating the width, the width may be calculated according to the maximum horizontal coordinate and the minimum horizontal coordinate, i.e., a difference between the maximum horizontal coordinate and the minimum horizontal coordinate, and an absolute value of the difference is the width of the corrected face region.

When calculating the height, the height may be calculated according to the maximum vertical coordinate and the minimum vertical coordinate, i.e., a difference between the maximum vertical coordinate and the minimum vertical coordinate, and an absolute value of the difference is the height of the corrected face region.

After calculating the width and height of the corrected face region according to the corrected characteristic point coordinates, step 207 is executed.

Step 207: performing a normalization process on the corrected characteristic point coordinates according to the width and the height to obtain normalized coordinates.

Normalization is a dimensionless processing measure to make an absolute value of a physical system value become some relative value relation, and is an effective measure to simplify the calculation and reduce the magnitude. For example, after each frequency value in the filter is normalized by the cut-off frequency, all the frequencies are relative values of the cut-off frequency, and there is no dimension.

The normalized coordinates refer to coordinates obtained after normalization process on the corrected characteristic point coordinates.

After calculating the height and the width of the corrected face region, the corrected characteristic points can be normalized according to the height and the width, thereby obtaining the normalized coordinates corresponding to the corrected characteristic point coordinates.

The normalized coordinates include normalized horizontal coordinates and normalized vertical coordinates, and the process of obtaining the normalized coordinates may refer to the following description of a specific implementation.

In a specific implementation of the present disclosure, the step 207 may comprise:

sub-step A1: performing a normalization process on the horizontal coordinates corresponding to the corrected characteristic point coordinates according to the width, to obtain normalized horizontal coordinates.

In the embodiment of the present disclosure, after obtaining the width of the corrected face region, the horizontal coordinates corresponding to the corrected characteristic point coordinates may be normalized according to the width, so as to obtain normalized horizontal coordinates.

It can be understood that there are a plurality of corrected characteristic point coordinates, respectively denoted as $x_1$, $x_2, \ldots, x_n$, where n is a positive integer greater than or equal to 1, and the width is denoted as w; the horizontal coordinates corresponding to the corrected characteristic point coordinates are normalized according to the width to obtain normalized horizontal coordinates $x_1/w, x_2/w, \ldots, x_n/w$.

Sub-step A2: performing a normalization process on vertical coordinates corresponding to the corrected characteristic point coordinates according to the height, to obtain normalized vertical coordinates.

After obtaining the height of the corrected face region, the vertical coordinates corresponding to the corrected characteristic point coordinates can be normalized according to the height, so as to obtain normalized vertical coordinates.

It can be understood that there are a plurality of corrected characteristic point coordinates, respectively denoted as $y_1$, $y_2, \ldots, y_n$, where n is a positive integer greater than or equal to 1, and the width is denoted as h; the vertical coordinates corresponding to the corrected characteristic point coordinates are normalized according to the height, to obtain the normalized vertical coordinates: $y_1/h, y_2/h, \ldots, y_n/h$.

After performing the normalization process on the corrected characteristic point coordinates according to the width and the height to obtain normalized coordinates, step 208 is performed.

Step 208: processing the normalized coordinates to generate the face global features.

After obtaining the normalized coordinates, the normalized coordinates may be processed, specifically, the normalized coordinates corresponding to all the characteristic points may be connected to obtain a one-dimensional vector, and the one-dimensional vector is used as the face global feature.

In the above process, the normalized coordinates include both normalized horizontal coordinates and normalized vertical coordinates, and further, the normalized horizontal coordinates and the normalized vertical coordinates after the normalization process, corresponding to all the corrected characteristic points, are connected to generate a face global feature vector, for example: $x_i, y_i, \ldots x_j, y_j$, and the face global feature vector is a one-dimensional global feature vector, and then the one-dimensional global feature vector can be used as the face global feature.

Step 209: performing a size transformation process on a corrected face region corresponding to the corrected face image according to a preset ratio, to obtain a transformed face image.

In the embodiment of the present disclosure, the preset ratio may be a ratio preset by a service person to perform size transformation on a face region in a face image.

The transformed face image refers to a face image obtained after size transformation is performed on a corrected face region in a corrected image.

After obtaining the corrected face image, the corrected face region corresponding to the corrected face image may be subjected to a size transformation process according to the preset ratio, for example, the face region in the corrected face image is zoomed in or out to the preset ratio according to the height (for example, the preset ratio N may be 64, etc.).

Step 210: performing a coordinate transformation process on the corrected characteristic point coordinates according to the preset ratio, to obtain transformed characteristic point coordinates.

The transformed characteristic point coordinates refer to characteristic point coordinates obtained after coordinate transformation process is performed on the corrected characteristic point coordinates.

After performing the size transformation process on the corrected face region according to the preset ratio, the coordinate transformation process can be performed on the corrected characteristic point coordinates according to the preset ratio, thereby obtaining transformed characteristic point coordinates.

Step 211: determining a region of interest in the transformed face region corresponding to the transformed face image according to the transformed face characteristic points in the transformed face image.

Region Of Interest (ROI): in machine vision and image processing, a region to be processed, outlined from a processed image in the form of a square, a circle, an ellipse, an irregular polygon, or the like, is called a region of interest.

In the image processing region, the region of interest is an image region selected from the image and is the focus of image analysis, and the region is delimited for further processing. Delimiting the region of interest using ROI can reduce processing time and increase accuracy.

Figure 1B:
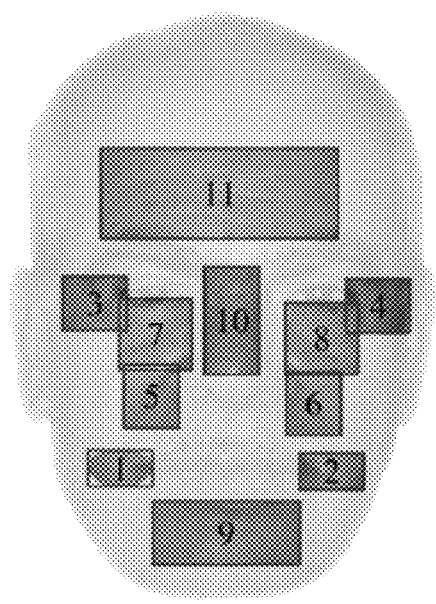
FIG. 1b is a schematic diagram illustrating a region of interest provided by an embodiment of the present disclosure.

After obtaining the transformed face image, a region of interest may be determined from the transformed face region according to the transformed characteristic points, for example, FIG. 1b is a schematic diagram illustrating a region of interest provided by the embodiment of the present disclosure. As shown in FIG. 1b, 11 regions of interest, such as forehead, chin, nose, corners of eyes, cheek, and corners of mouth, of the face may be determined according to the characteristic points, e.g., 1, 2, . . . , 11 as shown in FIG. 1b.

It is to be understood that the above examples are only examples listed for the purpose of better understanding of the technical solutions of the embodiments of the present disclosure, and are not intended as only limitations to the embodiments of the present disclosure.

After determining the region of interest in the transformed face region corresponding to the transformed face image according to the transformed face characteristic points in the transformed face image, step 212 is performed.

Step 212: extracting initial face local features in the region of interest by adopting a preset feature extraction algorithm.

Step 213: calculating normalized histogram features corresponding to the initial face local features, and taking the normalized histogram features as the face local features.

The preset feature extraction algorithm is an algorithm for extracting initial face local features from a region of interest, and specifically, corresponding initial face local features can be extracted according to different side faces in the transformed face image, which is described in detail in the following.

As shown in FIG. 1b, in the case of determining whether a face is in a side face, whether the face is in a side-face is determined according to width ratios of 4 pairs (1 and 2, 3 and 4, 5 and 6, 7 and 8) of symmetric regions of interest. The determination may be based on the following rule: if ratios of the widths in the left side face to the corresponding widths in the right side face of the 4 pairs of symmetric regions are all less than 0.5, then the face is in the right side face, and if the ratios are all greater than 2, then the face is in the left side face.

For the 4 pairs of symmetric regions of interest (1 and 2, 3 and 4, 5 and 6, 7 and 8), 4 initial face local features are extracted and generated according to the following steps:

a) if the face is the left side face, for one pair of symmetrical ROI regions, only extracting local features CoLBP (namely the face initial local features) of the ROI region of the left side face, and calculating the normalized histogram as the features;

b) if the face is the right side face, for one pair of symmetrical ROI regions, only extracting local features CoLBP of the ROI region of the right side face, and calculating the normalized histogram as the features;

c) otherwise, for one pair of symmetric ROI regions, extracting their local features CoLBP, and meanwhile, counting the normalized histogram of the one pair of symmetric regions as the features.

For the rest asymmetrical regions of interest (9, 10 and 11), their local features CoLBP are extracted, and their normalized histograms are calculated as the features.

After the 7 features are obtained, the 7 features may be connected to generate a one-dimensional vector, and the one-dimensional vector may be used as the face local features.

After calculating the normalized histogram features corresponding to the initial face local features and taking the normalized histogram features as the face local features, step 214 is executed.

Step 214: determining an age recognition result corresponding to the face image to be recognized according to the face global features, the face local features and an age recognition model obtained by pre-training.

After obtaining the face global features and the face local features, the face global features and the face local features can be used as face age features, and specifically, the obtained face global features and the face local features are both one-dimensional vectors, so that the two one-dimensional vectors can be connected to form a combined one-dimensional vector, and the combined one-dimensional vector is a face age feature.

The age recognition model is a model that can recognize an age of a user according to a face image of the user, and the age recognition model in the embodiment of the present disclosure may be an SVM (Support Vector Machine) classifier.

The age recognition model can be obtained by training with a plurality of sample face images of a preset age group, and a specific process thereof can refer to the following description.

The preset age group may be an age group preset by service personnel, for example, the service personnel may preset 5 to 10 years old as an age group, 10 to 15 years old as an age group, 15 to 20 years old as an age group, and the like.

It is to be understood that the above examples are only examples listed for the purpose of better understanding of the technical solutions of the embodiments of the present disclosure, and are not intended as only limitations to the embodiments of the present disclosure.

The sample face images refer to images used for training the age recognition model, and in a specific implementation, 800 or 1000 etc. sample face images may be selected to train the model, and specifically, the number may be determined according to an actual situation, which is not limited in the embodiment of the present disclosure.

Naturally, multiple sample face images can be respectively selected for different preset age groups to train the model, and the number of the sample face images selected for each preset age group may be the same or different, and is not limited in the embodiment of the present disclosure.

In some examples, the sample face images may be a plurality of sample face images of a preset age group collected by business personnel.

In some examples, the sample face images may be a plurality of sample face images of a preset age group downloaded by business personnel through Internet search.

Of course, without being limited to this, in specific implementations, the sample face images of the preset age group can be obtained in other manners, the sample face image of the preset age group are acquired from a preset face image database, and the like, and specifically, these may be determined according to business requirements and are not limited in the embodiment of the present disclosure.

After acquiring the sample face images of a preset age group, face global features and face local features in the sample face image can be respectively extracted, and the face global features and the face local features are input into an SVM classifier for training as age features corresponding to the preset age group, so that an age recognition model can be obtained.

It is to be understood that the above model training process is merely a model training scheme provided for better understanding the technical solution of the embodiment of the present disclosure, and in a specific implementation, a person skilled in the art may also adopt other model training modes, which are not limited in this embodiment of the present disclosure.

After obtaining the age recognition model through training, the age recognition features corresponding to the face image to be recognized can be input into the age recognition model obtained through pre-training, and an age recognition result corresponding to the face image to be recognized, namely an age group of the user corresponding to the age to be recognized, can be determined from the age recognition model according to the age recognition features.

The age recognition model provided by the embodiment of the present disclosure can effectively reduce the influences of different image resolutions, sexes, different face postures and expressions on the face age recognition by fusing the global features and the local features, and is high in algorithm precision and speed.

The age recognition method provided by the embodiments of the present disclosure comprises: acquiring a face image to be recognized; extracting face characteristic points in the face image to be recognized and characteristic point coordinates of the face characteristic points in the face image to be recognized; extracting face global features from the face image to be recognized according to the characteristic point coordinates; extracting face local features from the face image to be recognized according to the face characteristic points; and determining an age recognition result corresponding to the face image to be recognized according to the face global features, the face local features and an age recognition model obtained by pre-training. The age recognition model provided by the embodiments of the present disclosure can effectively reduce the influences of different image resolutions, sexes, different face postures and expressions on the face age recognition by fusing the global features and the local features, is high in algorithm precision and speed, and is low in requirement on hardware.

Figure 3:
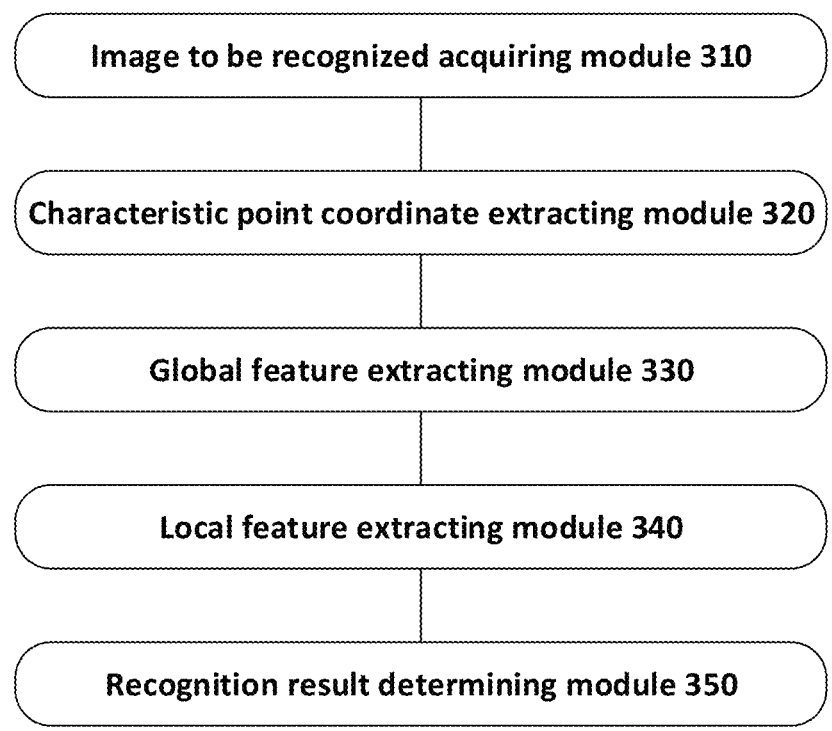
FIG. 3 is a schematic diagram illustrating a structure of an age recognition device provided by an embodiment of the present disclosure.

FIG. 3 is a schematic diagram illustrating a structure of an age recognition device provided by an embodiment of the present disclosure, where the age recognition device may specifically comprise the following modules:

an image to be recognized acquiring module 310 configured to acquire a face image to be recognized;

a characteristic point coordinate extracting module 320 configured to extract face characteristic points in the face image to be recognized, and characteristic point coordinates of the face characteristic points in the face image to be recognized;

a global feature extracting module 330 configured to extract face global features from the face image to be recognized according to the characteristic point coordinates;

a local feature extracting module 340 configured to extract face local features from the face image to be recognized according to the face characteristic points; and a recognition result determining module 350 configured to determine an age recognition result corresponding to the face image to be recognized according to the face global features, the face local features and an age recognition model obtained by pre-training.

The age recognition device provided by the embodiments of the present disclosure comprises: acquiring a face image to be recognized; extracting face characteristic points in the face image to be recognized, and characteristic point coordinates of the face characteristic points in the face image to be recognized; extracting face global features from the face image to be recognized according to the characteristic point coordinates; extracting face local features from the face image to be recognized according to the face characteristic points; and determining an age recognition result corresponding to the face image to be recognized according to the face global features, the face local features and an age recognition model obtained by pre-training.

The age recognition model provided by the embodiments of the present disclosure can effectively reduce the influences of different image resolutions, sexes, different face postures and expressions on the face age recognition by fusing the global features and the local features, is high in algorithm precision and speed, and is low in requirement on hardware.

Figure 4:
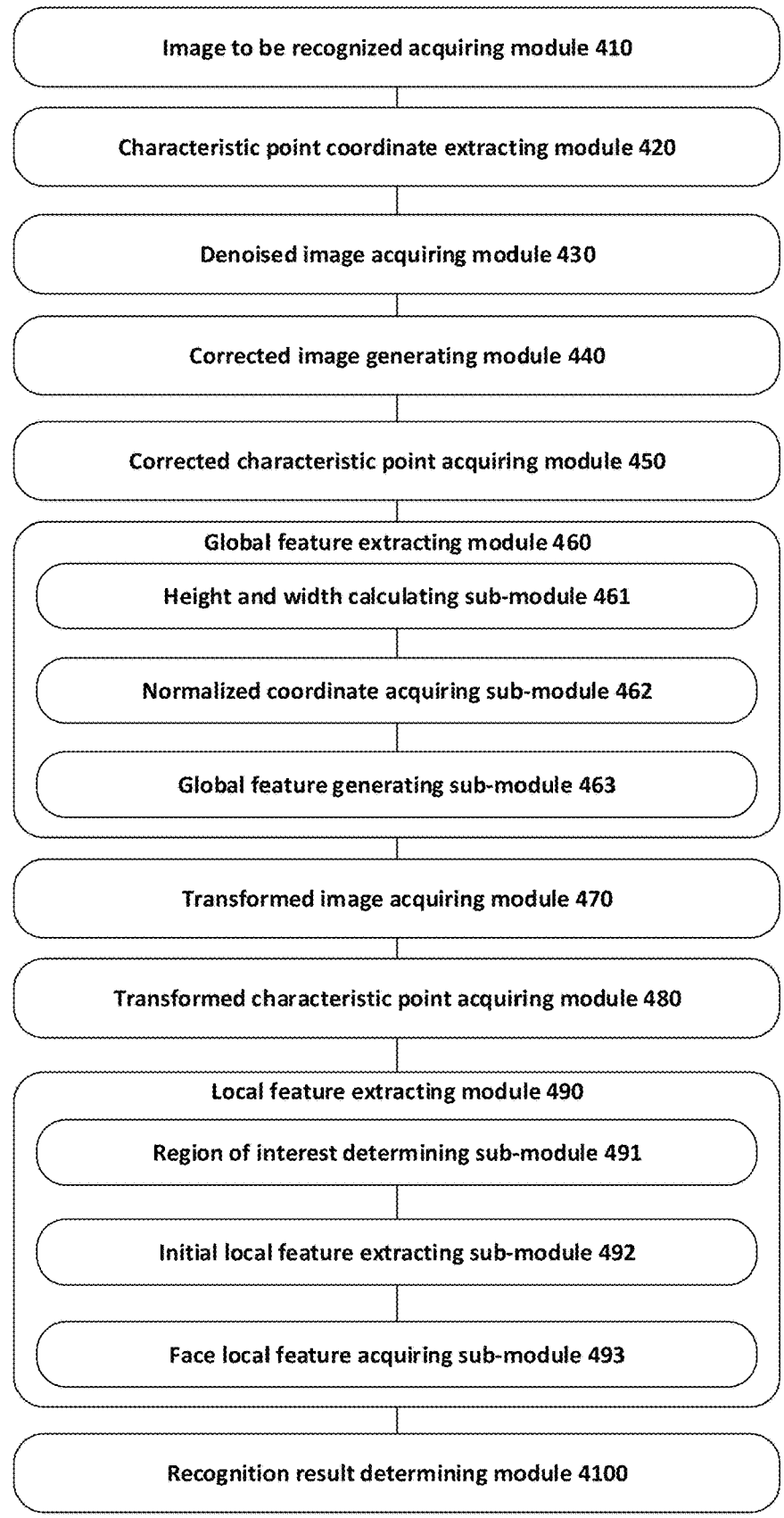
FIG. 4 is a schematic diagram illustrating a structure of an age recognition device provided by an embodiment of the present disclosure.

FIG. 4 is a schematic diagram illustrating a structure of an age recognition device provided by an embodiment of the present disclosure, where the age recognition device may specifically comprise the following modules:

an image to be recognized acquiring module 410 configured to acquire a face image to be recognized;

a characteristic point coordinate extracting module 420 configured to extract face characteristic points in the face image to be recognized, and characteristic point coordinates of the face characteristic points in the face image to be recognized;

a denoised image acquiring module 430 configured to denoise the face image to be recognized to obtain a denoised face image;

a corrected image generating module 440 configured to perform a geometric correction process on a face region in the denoised face image according to the characteristic point coordinates, to generate a corrected face image; and a corrected characteristic point acquiring module 450 configured to acquire from the corrected face image corrected characteristic points corresponding to the face characteristic points, and corrected characteristic point coordinates corresponding to the corrected characteristic points;

a global feature extracting module 460 configured to extract face global features from the face image to be recognized according to the characteristic point coordinates;

a transformed image acquiring module 470 configured to perform a size transformation process on a corrected face region corresponding to the corrected face image according to a preset ratio, so as to obtain a transformed face image;

a transformed characteristic point acquiring module 480 configured to perform a coordinate transformation process on the corrected characteristic point coordinates according to a preset ratio, to obtain transformed characteristic point coordinates;

a local feature extracting module 490 configured to extract local face features from the face image to be recognized according to the face characteristic points;

a recognition result determining module 4100 configured to determine an age recognition result corresponding to the face image to be recognized according to the face global features, the face local features, and an age recognition model obtained by pre-training.

In a specific implementation of the present disclosure, the global feature extracting module 460 comprises:

a height and width calculating sub-module 461 configured to calculate a width and a height of a corrected face region according to the corrected characteristic point coordinates;

a normalized coordinate acquiring sub-module 462 configured to perform a normalization process on the corrected characteristic point coordinates according to the width and the height, to obtain normalized coordinates; and a global feature generating sub-module 463 configured to process the normalized coordinates to generate the face global features.

In a specific implementation of the present disclosure, the normalized coordinate acquiring sub-module 462 comprises:

a normalized horizontal coordinate acquiring sub-module configured to perform a normalization process on horizontal coordinates corresponding to the corrected characteristic point coordinates according to the width, to obtain normalized horizontal coordinates; and a normalized vertical coordinate acquiring sub-module configured to perform a normalization process on vertical coordinates corresponding to the corrected characteristic point coordinates according to the height, to obtain normalized vertical coordinates.

In a specific implementation of the present disclosure, the global feature generating sub-module 463 comprises:

a face global feature acquiring sub-module configured to generate a one-dimensional global feature vector according to the normalized horizontal coordinates and the normalized vertical coordinates, and taking the one-dimensional global feature vector as the face global features.

In a specific implementation of the present disclosure, the local feature extracting module 490 comprises:

a region of interest determining sub-module 491 configured to determine a region of interest in a transformed face region corresponding to the transformed face image according to the transformed face characteristic points in the transformed face image;

an initial local feature extracting sub-module 492 configured to extract initial face local features in the region of interest by adopting a preset feature extraction algorithm; and a face local feature acquiring sub-module 493 configured to calculate normalized histogram features corresponding to the initial face local features, and take the normalized histogram features as the face local features.

The age recognition device provided by the embodiments of the present disclosure comprises: acquiring a face image to be recognized; extracting face characteristic points in the face image to be recognized, and characteristic point coordinates of the face characteristic points in the face image to be recognized; extracting face global features from the face image to be recognized according to the characteristic point coordinates; extracting face local features from the face image to be recognized according to the face characteristic points; and determining an age recognition result corresponding to the face image to be recognized according to the face global features, the face local features and an age recognition model obtained by pre-training. The age recognition model provided by the embodiments of the present disclosure can effectively reduce the influences of different image resolutions, sexes, different face postures and expressions on the face age recognition by fusing the global features and the local features, is high in algorithm precision and speed, and is low in requirement on hardware.

For the purposes of simplicity of explanations, the foregoing method embodiments have been presented as a series of actions or combinations thereof, it will be appreciated by those of ordinary skill in the art that the present disclosure is not limited by the order of the actions, as some steps may, in accordance with the present disclosure, occur in other orders and/or concurrently. Further, those skilled in the art will appreciate that one or more of the actions and modules involved therein the embodiments described in the specification are preferred embodiments may be omitted, or other actions or modules may be added.

Additionally, an embodiment of the present disclosure further provides an electronic device, comprising: a processor, a memory and a computer program stored on the memory and executable on the processor, the processor, when executing the program, implementing any of the aforementioned age recognition methods. The electronic device may comprise but are not limited to a desk computer, a laptop, a mobile terminal, a game machine, and the like.

Figure 5:
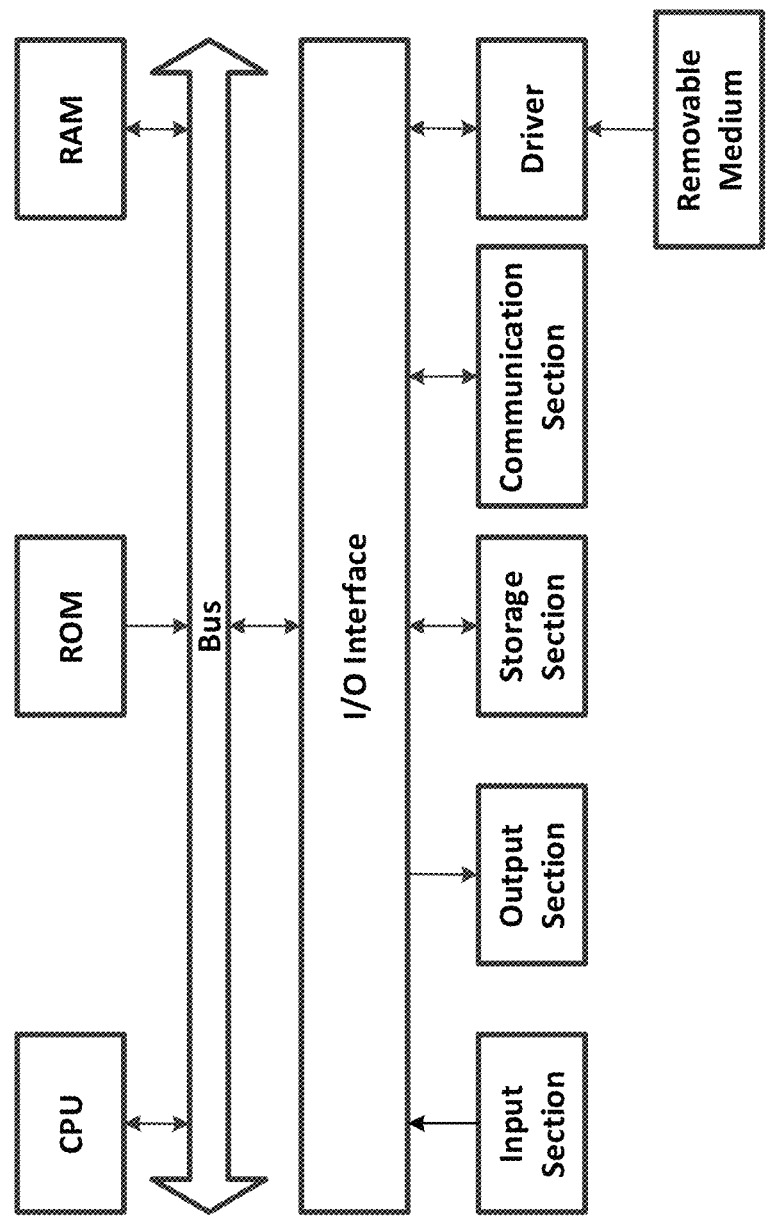
FIG. 5 is a schematic structure diagram illustrating a computer system provided by an embodiment of the present disclosure.

FIG. 5 is a schematic structure diagram illustrating a computer system according to an embodiment of the present disclosure. The computer system can be used for realizing the electronic device provided by the embodiment of the present disclosure.

As shown in FIG. 5, the computer system may include a central processing module (CPU) that can perform various appropriate actions and processes according to a program stored in a Read Only Memory (ROM) or a program loaded from a storage section into a Random Access Memory (RAM). In the RAM, various programs and data necessary for an operation of the computer system are also stored. The CPU, ROM and RAM are connected to each other via a bus. An input/output (I/O) interface is also connected to the bus.

The following components are connected to the I/O interface: an input section including a keyboard, a mouse, and the like; an output section including a Liquid Crystal Display (LCD), a speaker, and the like; a storage section including a hard disk, and the like; and a communication section including a network interface card such as a LAN card, a modem, or the like. The communication section performs communication processing via a network such as the Internet. A drive is also connected to the I/O interface as needed. A removable medium such as a magnetic disk, an optical disk, a magneto-optical disk, a semiconductor memory, or the like is mounted on the drive as needed, so that a computer program read out therefrom is mounted into the storage section as needed.

In particular, the process described by the flowcharts hereinabove may be implemented as a computer software program according to the present embodiment. For example, the present embodiment includes a computer program product comprising a computer program tangibly embodied on a computer readable medium, the computer program comprising program codes for performing the method illustrated in the flowchart. In such an embodiment, the computer program may be downloaded and installed from a network via the communication section, and/or installed from a removable medium.

The flowcharts and schematic diagrams in the figures illustrate the architecture, functionality, and operation of possible implementations of the system, method and computer program product according to the present embodiment. In this regard, each block in the flowcharts or schematic diagrams may represent a module, program segment, or portion of codes, which comprises one or more executable instructions for implementing specified logical function(s). It should also be noted that, in some alternative implementations, the functions noted in the blocks may occur in an order different from that noted in the figures. For example, two blocks shown in succession may, in fact, be executed substantially concurrently, or they may sometimes be executed in a reverse order, depending upon the function involved. It will also be noted that each block of the schematic diagrams and/or flowcharts, and combinations of blocks in the schematic diagrams and/or flowcharts, can be implemented by a special purpose hardware-based system which performs specified functions or operations, or implemented by a combination of special purpose hardware and computer instructions.

The modules described in the present embodiment may be implemented by software or hardware. The described modules may also be provided in a processor.

The embodiments in the specification are all described in a progressive manner, and each embodiment focuses on differences from other embodiments, and portions that are the same and similar between the embodiments may refer to each other.

Finally, it should also be noted that, in this document, relational terms such as first and second, and the like are used solely to distinguish one entity or operation from another entity or operation without necessarily requiring or implying any actual such relation or order between such entities or operations. Also, the terms "comprise," "include" or any other variants thereof, are intended to cover a non-exclusive inclusion, such that a process, method, article, or device that comprises a list of elements does not include only those elements but also include other elements not expressly listed or inherent to such process, method, article, or device. Without further limitation, an element defined by the phrase "comprising an . . . . . . " does not exclude the presence of other identical elements in the process, method, article, or device that includes the element.

The age recognition method, the age recognition device and the electronic device provided by the present disclosure are introduced in detail above, and specific examples are applied in this document to explain the principles and the implementations of the present disclosure, and the description of the above embodiments is only used to help understand the method and its core ideas of the present disclosure; meanwhile, for a person skilled in the art, according to the idea of the present disclosure, there may be variations in the specific implementations and application scopes, and in summary, the content of the specification should not be construed as a limitation to the present disclosure.

What is claimed is:

1. An age recognition method, comprising:
acquiring a face image to be recognized;
extracting face characteristic points in the face image to be recognized and characteristic point coordinates of the face characteristic points in the face image to be recognized;
extracting face global features from the face image to be recognized according to the characteristic point coordinates;
extracting face local features from the face image to be recognized according to the face characteristic points; and
determining an age recognition result corresponding to the face image to be recognized according to the face global features, the face local features and an age recognition model obtained by pre-training,
wherein after extracting face characteristic points in the face image to be recognized and characteristic point coordinates of the face characteristic points in the face image to be recognized, the method further comprises:
denoising the face image to be recognized to obtain a denoised face image;
performing a geometric correction process on a face region in the denoised face image according to the characteristic point coordinates, to generate a corrected face image; and
acquiring from the corrected face image corrected characteristic points corresponding to the face characteristic points and corrected characteristic point coordinates corresponding to the corrected characteristic points.

2. The method according to claim 1, wherein the extracting face global features from the face image to be recognized according to the characteristic point coordinates comprises:
calculating a width and a height of a corrected face region according to the corrected characteristic point coordinates;
performing a normalization process on the corrected characteristic point coordinates according to the width and the height, to obtain normalized coordinates; and
processing the normalized coordinates to generate the face global features.

3. The method according to claim 2, wherein the performing a normalization process on the corrected characteristic point coordinates according to the width and the height, to obtain normalized coordinates comprises:
performing a normalization process on horizontal coordinates corresponding to the corrected characteristic point coordinates according to the width, to obtain normalized horizontal coordinates; and
performing a normalization process on vertical coordinates corresponding to the corrected characteristic point coordinates according to the height, to obtain normalized vertical coordinates.

4. The method according to claim 3, wherein the processing the normalized coordinates to generate the face global features comprises:
generating a one-dimensional global feature vector according to the normalized horizontal coordinates and the normalized vertical coordinates, and taking the one-dimensional global feature vector as the face global features.

5. The method according to claim 1, wherein after acquiring from the corrected face image corrected characteristic points corresponding to the face characteristic points and corrected characteristic point coordinates corresponding to the corrected characteristic points, the method further comprises:
performing a size transformation process on the corrected face region corresponding to the corrected face image according to a preset ratio, to obtain a transformed face image; and
performing a coordinate transformation process on the corrected characteristic point coordinates according to the preset ratio, to obtain transformed characteristic point coordinates.

6. The method according to claim 5, wherein the extracting face local features from the face image to be recognized according to the face characteristic points comprises:
determining a region of interest in a transformed face region corresponding to the transformed face image according to the transformed face characteristic points in the transformed face image;
extracting initial face local features in the region of interest by adopting a preset feature extraction algorithm; and
calculating normalized histogram features corresponding to the initial face local features, and taking the normalized histogram features as the face local features.

7. A non-transitory computer storage medium having stored thereon computer-readable program instructions, when executed by a processor, perform the following operations:
acquiring a face image to be recognized;

extracting face characteristic points in the face image to be recognized and characteristic point coordinates of the face characteristic points in the face image to be recognized;

extracting face global features from the face image to be recognized according to the characteristic point coordinates;

extracting face local features from the face image to be recognized according to the face characteristic points; and determining an age recognition result corresponding to the face image to be recognized according to the face global features, the face local features and an age recognition model obtained by pre-training, wherein the computer-readable program instructions, when executed by a processor, further perform the following operations: after extracting face characteristic points in the face image to be recognized and characteristic point coordinates of the face characteristic points in the face image to be recognized, denoising the face image to be recognized to obtain a denoised face image;

performing a geometric correction process on a face region in the denoised face image according to the characteristic point coordinates, to generate a corrected face image; and acquiring from the corrected face image corrected characteristic points corresponding to the face characteristic points and corrected characteristic point coordinates corresponding to the corrected characteristic points.

8. The non-transitory computer storage medium according to claim 4, wherein the extracting face global features from the face image to be recognized according to the characteristic point coordinates comprises:

calculating a width and a height of a corrected face region according to the corrected characteristic point coordinates;

performing a normalization process on the corrected characteristic point coordinates according to the width and the height, to obtain normalized coordinates; and processing the normalized coordinates to generate the face global features.

9. The non-transitory computer storage medium according to claim 8, wherein the performing a normalization process on the corrected characteristic point coordinates according to the width and the height, to obtain normalized coordinates comprises:

performing a normalization process on horizontal coordinates corresponding to the corrected characteristic point coordinates according to the width, to obtain normalized horizontal coordinates; and performing a normalization process on vertical coordinates corresponding to the corrected characteristic point coordinates according to the height, to obtain normalized vertical coordinates.

10. The non-transitory computer storage medium according to claim 9, wherein the processing the normalized coordinates to generate the face global features comprises:

generating a one-dimensional global feature vector according to the normalized horizontal coordinates and the normalized vertical coordinates, and taking the one-dimensional global feature vector as the face global features.

11. The non-transitory computer storage medium according to claim 7, wherein the computer-readable program instructions, when executed by a processor, further perform the following operations: after acquiring from the corrected face image corrected characteristic points corresponding to the face characteristic points and corrected characteristic point coordinates corresponding to the corrected characteristic points:

performing a size transformation process on the corrected face region corresponding to the corrected face image according to a preset ratio, to obtain a transformed face image; and performing a coordinate transformation process on the corrected characteristic point coordinates according to the preset ratio, to obtain transformed characteristic point coordinates.

12. The non-transitory computer storage medium according to claim 11, wherein the extracting face local features from the face image to be recognized according to the face characteristic points comprises: determining a region of interest in a transformed face region corresponding to the transformed face image according to the transformed face characteristic points in the transformed face image;

extracting initial face local features in the region of interest by adopting a preset feature extraction algorithm; and calculating normalized histogram features corresponding to the initial face local features, and taking the normalized histogram features as the face local features.

13. An electronic device, comprising:

a processor, a memory and a computer program stored on the memory and executable on the processor, the processor configured to, when executing the computer program, perform the following operations:

acquiring a face image to be recognized;

extracting face characteristic points in the face image to be recognized, and characteristic point coordinates of the face characteristic points in the face image to be recognized;

extracting face global features from the face image to be recognized according to the characteristic point coordinates;

extracting face local features from the face image to be recognized according to the face characteristic points; and determining an age recognition result corresponding to the face image to be recognized according to the face global features, the face local features and an age recognition model obtained by pre-training, wherein the processor is configured to, when executing the computer program, further perform the following operations:

after extracting face characteristic points in the face image to be recognized, and characteristic point coordinates of the face characteristic points in the face image to be recognized;

denoising the face image to be recognized to obtain a denoised face image;

performing a geometric correction process on a face region in the denoised face image according to the characteristic point coordinates, to generate a corrected face image; and acquiring from the corrected face image corrected characteristic points corresponding to the face characteristic points and corrected characteristic point coordinates corresponding to the corrected characteristic points.

14. The electronic device according to claim 13, wherein the extracting face global features from the face image to be recognized according to the characteristic point coordinates comprises:

calculating a width and a height of a corrected face region according to the corrected characteristic point coordinates;

performing a normalization process on the corrected characteristic point coordinates according to the width and the height, to obtain normalized coordinates; and processing the normalized coordinates to generate the face global features.

15. The electronic device according to claim 14, wherein the performing a normalization process on the corrected characteristic point coordinates according to the width and the height, to obtain normalized coordinates comprises:

performing a normalization process on horizontal coordinates corresponding to the corrected characteristic point coordinates according to the width, to obtain normalized horizontal coordinates; and performing a normalization process on vertical coordinates corresponding to the corrected characteristic point coordinates according to the height, to obtain normalized vertical coordinates.

16. The electronic device according to claim 15, wherein the processing the normalized coordinates to generate the face global features comprises:

generating a one-dimensional global feature vector according to the normalized horizontal coordinates and the normalized vertical coordinates, and taking the one-dimensional global feature vector as the face global features.

17. The electronic device according to claim 13, wherein the processor is configured to, when executing the computer program, further perform the following operations:

after acquiring from the corrected face image corrected characteristic points corresponding to the face characteristic points and corrected characteristic point coordinates corresponding to the corrected characteristic points, performing a size transformation process on the corrected face region corresponding to the corrected face image according to a preset ratio, to obtain a transformed face image; and performing a coordinate transformation process on the corrected characteristic point coordinates according to the preset ratio, to obtain transformed characteristic point coordinates.

\* \* \* \* \*